INFORMATION STORAGE IN GLOW DISCHARGE DEVICES

Filed Oct. 11, 1957 2 Sheets-Sheet 1

INVENTOR.
JAMES T. SMITH
BY
Lippincott, Smith & Ralls
ATTORNEYS

INVENTOR.
JAMES T. SMITH
BY Lippincott, Smith & Ralls
ATTORNEYS 2,977,505
Patented Mar. 28, 1961

2,977,505

INFORMATION STORAGE IN GLOW DISCHARGE DEVICES

James T. Smith, San Jose, Calif., assignor to International Business Machines Corporation, New York, N.Y., a corporation of New York Filed Oct. 11, 1957, Ser. No. 689,563
13 Claims. (Cl. 315—84.5)

This invention relates to the storage of information, or memory, for data-handling systems, computers, and the like.

In computers and other data-handling systems, it is common practice to represent numerical and other information by combinations of electric pulses. Memory facilities are required for storing such information for varying lengths of time. A considerable variety of information-storage devices are currently in use, each having characteristics that make it desirable for certain applications and undesirable for others. The present invention provides a new type of memory facility that is relatively simply in construction, low in cost, flexible in applicaiton, and reliable in operation. It is reasonably compact, and operable at moderately high speeds. A random-access, nondestructive read-out, and other advantages are provided.

According to this invention, a continuing succession of voltage pulses is applied across a glow-discharge device, such as a small, cold-cathode neon lamp. Each applied pulse may strike a glow discharge in the device, or it may not, depending upon various operating conditions, including the pulse amplitude, the pulse width or duration, the pulse repetition rate, the bias or inter-pulse voltage across the device, the circuit impedance in series with the device, the amount of light entering the device from external sources, and the pre-existent ionization of the device due to preceding glow discharges. Thus, the operating conditions which determine whether or not an applied voltage pulse will strike a glow discharge comprise a number of factors or agents, which are inter-dependent in their effect upon the striking of a glow discharge since, in this respect, a change in any one of the determining factors, within certain limits, can be compensated by a change in one or more of the other factors.

The pulse rate of the applied pulses is chosen to provide a time interval between pulses that is shorter than the deionization time of the glow discharge device, so that the occurrence or non-occurrence of a glow discharge during the preceding applied pulse is a significant one of the factors which determine whether or not a particular applied pulse will strike a glow discharge within the glow discharge device. The other determining factors are adjusted to provide steady-state operating conditions such that each applied pulse will strike a glow discharge in the device in the presence of pre-existent ionization due to the occurrence of a glow discharge during the preceding pulse, but will fail to strike a glow discharge in the absence of such pre-existent ionization. Therefore, under steady-state operating conditions, the continuing succession of applied voltage pulses will maintain, but will not initiate, a continuing succession of glow discharges within the glow discharge device.

Thus, a two-state memory unit is provided, which is capable of storing one bit of binary information; e.g., the existence of a continuing succession of glow discharges may represent a stored bit, or binary one, whereas the absence of such glow discharges may represent the absence of a stored bit, or a binary zero. Switching from one state to another is accomplished by means of transient changes in one or more of the aforesaid determining factors or agents. That is, for the storage of a binary bit there is provided a temporary change in the operating conditions sufficient to strike an initial glow discharge in the absence of pre-existent ionization from a preceding glow discharge; and for the erasure of the stored information there is provided a temporary change in the operating conditions sufficient to interrupt the succession of glow discharges and to permit deionization of the glow discharge device.

In a preferred form, a binary storage unit comprises two gas-filled diodes disposed side-by-side so that a luminous glow discharge within either supplies light into the other. A first one of these two diodes is used to store a bit of binary information, and the second one of the two diodes is used for read-in and read-out functions. A continuing succession of voltage pulses is applied across the first diode, under steady-state operating conditions such that these pulses will maintain, but will not initiate, a continuing succession of glow discharges in the first diode without any glow discharge in the second diode. A plurality of such storage units can be combined to form an information-storage matrix of considerable capacity.

Read-in (or writing or transfer to storage) of a bit of information is accomplished by producing a temporary glow discharge in the second diode of a storage unit, which illuminates the first diode of the same unit for striking an initial glow discharge therein. The voltage pulses supplied to the first diode then maintain a continuing succession of glow discharges in the first diode, thus storing the information after the second diode is extinguished.

Read-out is accomplished by applying across the second diode of a selected storage unit voltage pulses sufficient to strike glow discharges therein in the presence of light received from the first diode, but insufficient to strike a glow discharge in the absence of such light. Consequently, pulses of current are conducted by the second diode if a bit has previously been stored in that unit, but not in the absence of a stored bit. This type of read-out is nondestructive—it duplicates the stored information without removing it from storage. The stored information can be erased by changing the operating conditions in any way that will interrupt the succession of glow discharges in the first diode; e.g., by the application of a sufficiently large negative bias voltage.

The foregoing and other aspects of this invention may be better understood from the following illustrative description and the accompanying drawings. The scope of the invention is defined by the appended claims.

Figure 1:
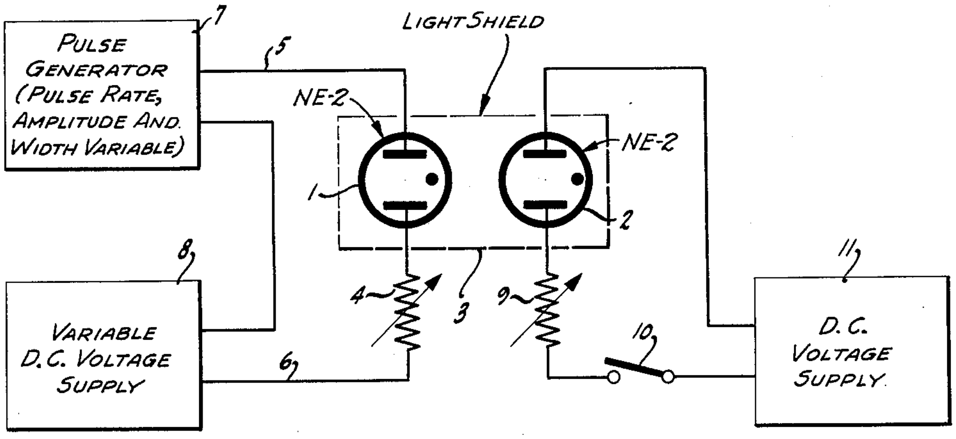
Fig. 1 is a schematic circuit diagram of glow discharge apparatus which may be operated as a binary storage unit.

Referring to Fig. 1 of the drawings, two cold-cathode, gas-filled diodes 1 and 2 are disposed side-by-side, so that a luminous discharge within either diode supplies light into the other diode. By way of example, each of the two diodes 1 and 2 may be a small neon lamp of the well known type NE–2. An opaque enclosure or light shield 3 may be provided for preventing any light from entering diode except from the other diode.

In the illustrated circuit, diodes 1 and 2 are enclosed within separate glass envelopes that light can pass through. However, it is evident that the two diodes might be contained within a single envelope, which might then be opaque so that the common envelope would perform the functions of light shield 3. Furthermore, the light shield may be omitted if the diodes are located in an environment wherein the amount of extraneous light is insufficient to interfere with the operation of the apparatus as hereinafter described.

Diode 1 is connected in series with a resistor 4 between two electrical conductors 5 and 6. As is well known to those skilled in the art, the application of a sufficient voltage between conductors 5 and 6 for a sufficient time will strike a luminous glow discharge within diode 1. The nominal glow-discharge striking voltage for a type NE–2 neon lamp is about 85 volts. After the glow discharge has been struck, the voltage across the diode drops to about 60 volts, and the difference between the last-mentioned voltage and the voltage applied between conductors 5 and 6 appears as a voltage drop across resistor 4. The magnitude of the voltage drop across resistor 4 divided by the resistance of the resistor determines the amount of current that flows through diode 1 while a glow discharge is sustained within the diode. Prior to the striking of a glow discharge the current through diode 1 is relatively small and may be considered negligible for present purposes. Hence, prior to the striking of a glow discharge, approximately the full voltage applied between conductors 5 and 6 appears between the electrodes of diode 1. A pulse generator 7, which preferably supplies substantially rectangular waveform voltage pulses, and a D.C. voltage supply 8 are connected as shown for supplying voltages between conductors 5 and 6.

Diode 2 is connected is series with a resistor 9 and a switch 10 across a D.C. voltage supply 11, which supplies sufficient voltage to strike a luminous glow discharge within diode 2 whenever switch 10 is closed. For example, supply 11 may supply a D.C. voltage of 100 volts.

The pulse generator 7, and the voltage supplies 8 and 11, may comprise any apparatus capable of supplying the voltages herein specified. Since numerous types of pulse generators and voltage supplies are well known to those skilled in the art, any detailed description thereof in this specification would be superfluous. For the purpose of illustrating a variety of operating conditions under which the present invention may be practiced, it is indicated in Fig. 1 that pulse generator 7 is adjustable to vary independently the rate, the amplitude, and the width (or duration) of the voltage pulses supplied by the pulse generator, that voltage supply 8 is adjustable to vary the D.C. voltage supplied by this voltage supply, and that resistors 4 and 9 are adjustable to vary their respective resistance values. In practice it is not necessary that all of these adjustments be provided in any one apparatus, since temporary changes in the operating conditions of diode 1 at selected times, as hereinafter more fully explained, can be accomplished by varying any one or more of the several values which these adjustments control, while the other values remain fixed.

Figure 2:
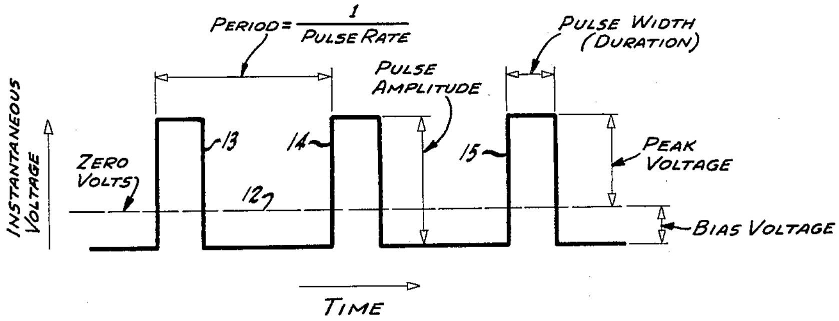
Fig. 2 is a representation of a voltage waveform which will be referred to in explaining the operation of the circuit shown in Fig. 1.

Fig. 2 illustrates a typical voltage waveform applied between conductors 5 and 6 by pulse generator 7 and D.C. voltage supply 8. Broken line 12 represents zero voltage between conductors 5 and 6, while the solid line in Fig. 2 represents the time-varying instantaneous values of the applied voltage. Pulse generator 7 supplies a continuing periodic succession of voltage pulses, three of which are shown at 13, 14 and 15. Legends applied to Fig. 2 illustrate the terminology employed in this specification. The pulse rate, pulse amplitude and pulse width are adjustable by means of conventional adjustments provided within pulse generator 7. If either electrode of diode 1 may serve equally well as the cathode, as is usually the case, the applied pulses may be either positive-going or negative-going. To simplify the description, it is hereinafter assumed that the pulses are positive-going, and any voltage of the same polarity as the pulses is called a positive voltage, while any voltage of the opposite polarity is called a negative voltage. The bias voltage, or inter-pulse voltage, may be either positive or negative, and its value is adjustable by means of a conventional adjustment within D.C. voltage supply 8, or by any other means. The peak voltage applied between conductors 5 and 6 is equal to the algebraic sum of the pulse amplitude and the bias voltage.

Assume that switch 10 is open, so that no light is supplied into diode 1 from external sources, and that the pulse amplitude is reduced to zero, by turning off pulse generator 7 or by making other appropriate adjustments. The voltage applied between conductors 5 and 6 is now equal to the bias voltage, and can be varied by adjusting D.C. voltage supply 8. When the applied voltage is low, there is no glow discharge within diode 1 and no appreciable current through the diode. Consequently, there is no appreciable voltage drop across resistor 4, and substantially the entire applied voltage appears between the two electrodes of diode 1. If the applied voltage is gradually increased, by adjusting voltage supply 8, a glow discharge will be struck within diode 1 when the applied voltage reaches a value of about 85 volts. (It is assumed that diode 1 is a type NE–2 neon lamp. Considerable variation will exist between diodes of different types, and even between different diodes of the same type, and from time to time with the same diode.) This value is herein called the nominal glow-discharge striking voltage of the diode.

After the glow discharge has been struck, the voltage across diode 1 drops to about 60 volts (for a type NE–2 lamp), and the difference between this voltage and the voltage applied between conductors 5 and 6 appears as a voltage drop across resistor 4. It is evident that the amount of current flowing through diode 1 and resistor 4 in series is equal to the voltage drop across resistor 4 divided by the resistance of resistor 4. Provided the current is not large enough to saturate the diode (remains within the normal glow discharge region), the voltage drop across diode 1 remains approximately constant while a glow discharge is maintained within the diode, and variations in the applied voltage produce corresponding changes in the voltage drop across resistor 4, and thus in the amount of current conducted by the diode. The approximately constant voltage drop across a diode during a normal glow discharge is sometimes called the glow voltage, or the glow-discharge sustaining voltage.

If now, by further adjustment of voltage supply 8, the applied voltage is reduced to a value smaller than the glow-discharge sustaining voltage, it is evident that the current passing through the diode will drop to approximately zero, and that the glow discharge will be extinguished.

Now assume that voltage supply 8 is adjusted to reduce the bias voltage to zero, and that pulse generator 7 is adjusted to supply a continuing succession of voltage pulses having a fairly large pulse width, e.g., several hundred microseconds, and a fairly long period, e.g., several hundred milliseconds. The peak voltage between conductors 5 and 6 is now equal to the pulse amplitude. If the pulse amplitude is smaller than the nominal glow-discharge striking voltage, the peak voltage applied across diode 1 will never exceed the glow-discharge striking voltage, and no glow discharge will be struck within diode 1. By further adjustment of pulse generator 7, the pulse amplitude may be gradually increased. Under the conditions just stated (zero bias voltage, wide pulses and a long period) it will be found that each applied pulse strikes a glow discharge within diode 1 whenever the pulse amplitude appreciably exceeds the nominal glow-discharge striking voltage, or about 85 volts.

Now assume that the pulse amplitude is set at a value slightly larger than the nominal glow-discharge striking voltage, so that each applied pulse strikes a glow discharge within diode 1. By further adjustment of pulse generator 7, the pulse width can be gradually reduced. It will be found that a certain minimum pulse width is required for striking a glow discharge, and that the applied pulses no longer strike glow discharges within diode 1 whenever the width of the pulses is reduced below this minimum. Thus, it is apparent that there is a brief delay between the sudden application of a sufficient voltage and the striking of a glow discharge within the diode, and that if the applied voltage persists for a time interval shorter than this delay, no glow discharge will be struck. This delay is herein called the ionization time of the diode.

Assume that the pulse amplitude has been set to a value somewhat larger than the nominal glow-discharge striking voltage, and that the pulse width has been reduced to a value slightly smaller than that required to strike a glow discharge within diode 1. If the pulse amplitude is now gradually increased without changing the pulse width, it will be found that each applied pulse again strikes a glow discharge within diode 1 whenever the pulse amplitude exceeds a certain value. When the pulse amplitude is left at this value, while the pulse width is again reduced, the applied pulses will again fail to strike glow discharges. Thus, successive decreases in the pulse width cause successive increases in the minimum pulse amplitude required to strike a glow discharge within diode 1.

From the foregoing it is evident that the ionization time of the diode varies as a function of the magnitude of the applied voltage, and that the pulse amplitude and the pulse width are inter-related factors or agents determining whether or not each pulse will strike a glow discharge within diode. By way of example, it has been found that pulses of 100 volts amplitude, at zero bias voltage, and in the absence of light or previous ionization, must have a duration exceeding about 50 microseconds for each pulse to strike a glow discharge within a type NE–2 neon lamp.

Now assume that the pulse amplitude is fixed at a constant value, about 100 volts for example, and that the pulse width is fixed at a constant value, about 50 microseconds for example, sufficient for each pulse to strike a glow discharge within diode 1 when the bias voltage is zero, and that the bias voltage is varied by adjusting voltage supply 8. When the bias voltage is either zero or positive, each applied pulse strikes a glow discharge within diode 1. If, however, the bias voltage is made increasingly negative (but not of sufficient magnitude to strike a glow discharge between pulses due to the bias voltage alone), the successive applied pulses will cease striking successive glow discharges within the diode. Thus, the bias voltage is a third factor or agent in determining whether or not each applied pulse will strike a glow discharge within the gas-filled diode. To a first approximation, with respect to the determination of whether or not each applied pulse will strike a glow discharge, changes in the bias voltage can be compensated by opposite changes in the pulse amplitude, and vice versa, to maintain a constant peak voltage between conductors 5 and 6.

When switch 10 is closed, a luminous glow discharge is struck and maintained within diode 2, and this discharge supplies light into diode 1. The amount of current flowing through diode 2, and to a considerable extent the amount of light supplied into diode 1, can be varied by adjusting the resistance of resistor 9. It has been found that supplying light into diode 1 in this manner has a large effect upon the ionization time of diode 1. For example, with no light supplied into diode 1 and no pre-existent ionization of the diode, an applied pulse having a peak voltage of about 100 volts must have a duration exceeding about 50 microseconds to strike a glow discharge within diode 1, whereas, with a substantial amount of light supplied into diode 1 by a luminous glow discharge within diode 2, a glow discharge may be struck within diode 1 by a pulse of the same amplitude having a duration as short as 3 microseconds. Consequently, it is evident that the amount of light supplied into diode 1 from external sources is a fourth factor or agent determining whether or not an applied pulse will strike a glow discharge within diode 1.

Even when there is no glow discharge within diode 1, the conductivity of the diode is not quite zero. Furthermore, alternating currents must flow through resistor 4 for charging and discharging circuit capacitances, including the capacitance between the electrodes of diode 1, as the applied voltage periodically changes in value. Consequently, prior to the striking of a glow discharge, the instantaneous voltage between the electrodes of diode 1 is not necessarily exactly equal to the instantaneous voltage applied between conductors 5 and 6, and the resistance of resistor 4 has some effect upon determining whether or not a glow discharge will be struck by an applied pulse. The pulse repetition rate may also have an effect, especially if the time interval between pulses is very short. Thus, the circuit impedance in series with the diode and the pulse repetition rate are fifth and sixth factors which to some extent determine whether or not each applied pulse will strike a glow discharge within diode 1.

Thus far it has been assumed that the time intervals between applied pulses are so long that the existence or non-existence of glow discharges during preceding pulses has negligible effect on the striking or non-striking of a glow discharge by any particular one of the applied pulses. Assume, for example, that the bias voltage is zero, the pulse amplitude is 100 volts, the pulse width is 20 microseconds, the pulse period is several hundred milliseconds, and the diodes are type NE–2 neon lamps. Under these conditions, each applied pulse will strike a glow discharge within diode 1 in the presence of light supplied into diode 1 by a luminous glow discharge within diode 2, but will fail to strike a glow discharge within diode 1 in the absence of such light. Thus, the closing and opening of switch 10 changes the operating conditions of diode 1 sufficiently for each applied pulse to strike a glow discharge within diode 1 when switch 10 is closed, but not when switch 10 is open. The stated time interval between pulses is sufficiently great that ionization of the gas within diode 1 produced by a glow discharge during any applied pulse is so greatly reduced, by recombination processes and the like, by the time when the next pulse is applied that the existence or non-existence of a glow discharge during preceding pulses has negligible effect on determining whether or not a glow discharge will be struck by any particular applied pulse. Consequently, a continuing succession of applied pulses produces a continuing succession of glow discharges within diode 1 so long as switch 10 remains closed, but the succession of glow discharges within diode 1 ends substantially upon the opening of switch 10 and the consequent extinguishing of the glow discharge within diode 2.

Now assume that the pulse rate is increased sufficiently to reduce the time interval between pulses to a value somewhat less than about 50 milliseconds. As long as switch 10 remains open, no glow discharge is struck within diode 1. If switch 10 is closed, a glow discharge is struck in diode 2, which supplies light into diode 1. This changes the operating conditions of diode 1 sufficiently for the applied pulses to strike glow discharges within diode 1, and consequently each applied pulse strikes a glow discharge within diode 1 while switch 10 remains closed.

If switch 10 is now opened, the glow discharge within diode 2 is extinguished, and no light is thereafter supplied into diode 1 from external sources. However, the applied pulses continue to strike glow discharges within diode 1 due to the fact that each glow discharge produces a substantial amount of ionization within diode 1, and the time interval between pulses is sufficiently short that an appreciable amount of this ionization is still present when the next pulse is applied. The pre-existent ionization facilitates the striking of a new glow discharge within the diode, and therefore the pre-existent ionization due to previous glow discharges is a seventh factor or agent in the conditions determining whether or not an applied pulse will strike a glow discharge.

Under the conditions just stated, zero bias voltage and no light supplied into the diode, the maximum time interval between pulses for which the existence or nonexistence of a glow discharge during the preceding pulse has an appreciable effect upon the striking or not striking of a new glow discharge is about 50 milliseconds. This is called the deionization time of the diode. The deionization time as well as the ionization time varies with changes in the operating conditions. For example, if voltage supply 8 is adjusted to provide a negative bias voltage of about 50 volts between the applied pulses, while generator 7 is adjusted to keep the peak voltage constant, the deionization time of diode 1 may be reduced from about 50 milliseconds to about 6 milliseconds.

The resistance of resistor 4 also has a substantial effect upon the deionization time of the diode, since the current passing through diode 1 during a glow discharge, and therefore the amount of ionization produced by each discharge, is a function of the series circuit resistance. The pulse amplitude, the pulse width, and the amount of light supplied into diode 1 from diode 2 may also influence the deionization time.

From the foregoing it is apparent that there are at least seven interdependent factors or agents comprised in the operating conditions which determine whether or not any particular applied pulse will strike a glow discharge within diode 1. Other factors, such as ambient temperature and the waveform of the applied pulses, may also be significant.

According to the present invention, the steady-state operating conditions of diode 1, and in particular the seven determining factors hereinbefore discussed, are so chosen that a continuing succession of voltage pulses applied between conductors 5 and 6 will maintain, but will not initiate, a continuing succession of glow discharges within diode 1. By way of example, asuming that the diodes 1 and 2 are type NE-2 neon lamps, the following steady-state conditions may be established: switch 10 open; bias voltage zero; pulse amplitude 100 volts; pulse width 25 microseconds; pulse rate 1000 per second (period one millisecond); and series resistance of such value that the glow discharge current is about half the saturation current of the diode.

It will be noted that the period chosen is sufficiently short that the time interval between pulses is appreciably less than the deionization time of the diode, so that the existence or non-existence of a glow discharge during the preceding pulse is a significant factor in determining whether or not any particular applied pulse will strike a glow discharge within diode 1. The other determining factors comprised in the steady-state conditions are so chosen that the applied pulses will not strike an initial glow discharge within diode 1, but will maintain a continuing succession of glow discharges within diode 1 after an initial discharge has been struck. Thus, a two-state circuit is provided, having a first stable operating state wherein no glow discharges occur within diode 1, and having a second stable operating state wherein a continuing succession of glow discharges occur within diode 1.

It is evident that the stated values for the various determining factors constitute only one example of a very large number of combinations of values which may be used to obtain the two-state type of operation described. Also, glow-discharge devices other than NE-2 lamps may be employed, with appropriate adjustments in the values of the several determining factors being made in consideration of differences in the striking voltages and other characteristics of different glow-discharge devices.

The two-state circuit thus provided can be switched from one to the other of its two operating states by transient changes in the operating conditions of diode 1, which may be effected by temporarily changing any one or more of the various factors or agents that determine whether or not a particular input pulse will strike a glow discharge.

For example, an initial glow discharge may be struck by closing switch 10 to provide a luminous glow discharge within diode 2 that supplies light into diode 1. Or voltage supply 8 may be adjusted to provide a positive bias voltage of sufficient magnitude that the peak voltages applied across diode 1 by the bias voltage and applied pulses combined is sufficient for the striking of an initial glow discharge. Or, pulse generator 7 may be adjusted to increase the pulse amplitude, the pulse width, or the pulse rate sufficiently for the striking of an initial glow discharge. Or other means, such as an additional, selectively operable pulse generator (not shown) may be employed for providing an additional voltage across diode 1. After the initial glow discharge has been struck, the steady-state operating conditions are restored and the continuing succession of voltage pulses provided by generator 7 will maintain a continuing succession of glow discharges within diode 1.

Other transient changes in the operating conditions of diode 1 can be employed to interrupt a continuing succession of glow discharges and switch the circuit back to its first operating state. For example, voltage supply 8 can be adjusted to provide a negative bias voltage of sufficient magnitude that the peak voltages provided by the input pulses are insufficient to strike a glow discharge within diode 1 even in the presence of pre-existent ionization due to the occurrence of a glow discharge during the preceding applied pulse. The negative bias voltage further assists in interrupting the succession of glow discharges by reducing the deionization time of the diode, as hereinbefore explained. Alternatively, a transient negative bias voltage can be provided by an additional pulse generator, not shown, which is selectively operable to provide negative voltage pulses having a width exceeding the deionization time of diode 1. Or, pulse generator 7 may be adjusted to reduce the pulse rate, pulse amplitude or pulse width sufficiently to interrupt the continuing succession of glow discharges. Or, the resistance of resistor 4 may be increased sufficiently, or the circuit might simply be broken at any convenient point, to reduce the glow discharge current to such a small value that insufficient ionization is produced by each glow discharge to maintain the continuing succession of discharges. These transient conditions are maintained for a sufficient time to permit the deionization of diode 1. Thereafter, the steady-state operating conditions may be restored.

When operated in the manner described, the circuit illustrated in Fig. 1 has considerable utility as a binary information-storage or memory unit. For example, the stable operating state wherein no glow discharges occur within diode 1 may represent the absence of a stored bit of information, or a binary zero, and the stable operating state wherein a continuing succession of glow discharges occurs in diode 1 may represent a stored bit of information, or a binary one.

Storage (or read-in or writing) of a bit can be accomplished by any of the means herein described for striking an initial glow discharge within diode 1. Non-destructive read-out of the stored information can be accomplished in a variety of ways. Since glow discharges within diode 1 produce light, the presence or absence of a stored bit can be determined by direct visual observation, or by any optical or electro-optical apparatus capable of distinguishing between the presence and the absence of light. Since substantial voltage pulses occur across resistor 4 only during glow discharges within diode 1, the presence or absence of a stored bit can be determined by any means responsive to the presence or absence of voltage pulses across resistor 4. A direct electrical read-out might also be obtained by any means responsive to the presence or absence of current pulses through the series circuit that includes diode 1. Erasure of the stored information can be accomplished by any of the means hereinbefore described for interrupting the succession of glow discharges within diode 1.

In actual practice, it is not necessary that all of the adjustments specified in Fig. 1 be provided. Since transient changes in the operating conditions of diode 1, for switching the circuit from one stable operating state to the other, can be effected by varying any one or more of several different determining factors or agents, great flexibility is provided in that a wide choice of switching means is available. For a particular application, means must be provided for varying those factors that are to be used for switching the circuit from one operating state to the other, or for adjusting the steady-state conditions to insure stable and reliable operation. The other determining factors may then be given fixed or substantially fixed values.

If electrical means only are to be employed for switching and read-out, diode 2 and its associated circuitry may be omitted. However, desirable advantages are obtained by employing diode 2 in the read-in and read-out functions, as is hereinafter more fully explained.

The memory unit illustrated in Fig. 1 has a storage capacity of only one bit of binary information, but it is evident that a considerable number of such memory units can be connected in various circuit configurations to provide an information-storage matrix of considerable capacity. Many of the circuit elements, such as the pulse generator and the voltage supplies, may be common to a large number of binary memory units. Thus, the total cost per bit of storage capacity is but little greater than the cost of the diodes in each memory unit, or a few cents per bit. This cost is quite low in view of the versatility and operating characteristics obtained. Even lower costs and more compact matrices can be obtained by replacing the individual diodes with special multiple-diode structures.

Figure 3:
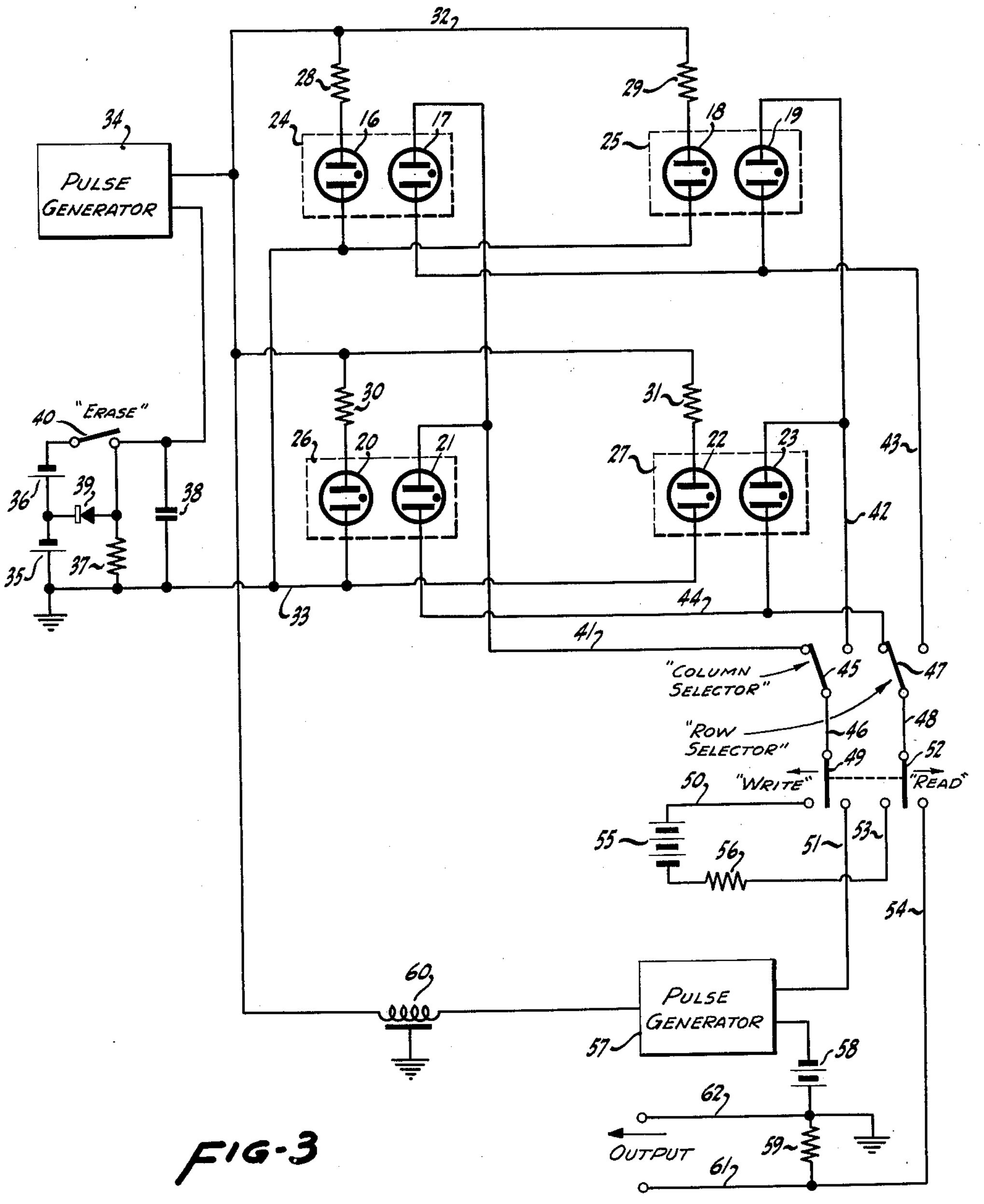
Fig. 3 is a schematic circuit diagram of an information-storage matrix.

Fig. 3 shows a circuit comprising four binary memory units comprised in an information-storage matrix having a storage capacity of four bits. It is evident that the matrix shown can readily be expanded to comprise a much larger number of binary units to provide a correspondingly larger storage capacity. In the matrix illustrated, the four binary memory units are disposed in upper and lower rows and in left and right columns, so that each memory unit is uniquely identified by the intersection of a specified row and column. It will be understood that these positions are for logical identification purposes only, and do not necessarily correspond to the physical locations of the parts in a structural embodiment. With reference to Fig. 3, the upper left memory unit comprises a first gas-filled diode 16 and a second gas-filled diode 17. The upper right memory unit comprises a first gas-filled diode 18 and a second gas-filled diode 19. The lower left memory unit comprises a first gas-filled diode 20 and a second gas-filled diode 21. The lower right memory unit comprises a first gas-filled diode 22 and a second gas-filled diode 23. Each of the eight diodes may, for example, be a type NE–2 neon glow-discharge lamp. The two diodes of each memory unit are disposed side by side, so that a luminous discharge in either supplies light into the other. The two diodes in each unit may be enclosed within an opaque light-shield, as indicated in the drawing by broken lines 24, 25, 26 and 27, or any other means may be provided, including spatial separation, to prevent the light produced in any unit from interfering with the desired operation of the other units.

Four resistors 28, 29, 30 and 31 are connected in series with the first diodes 16, 18, 20 and 22 of the four binary units, as shown. These four resistors, in series with the four first diodes, form four branch circuits, which are connected in parallel between two electrical conductors 32 and 33. If desired, conductor 33 may be circuit ground. A time-varying voltage is applied between conductors 32 and 33 by a pulse generator 34 and a variable D.C. voltage supply comprising voltage sources 35 and 36, a resistor 37, a bypass capacitor 38, a half-wave rectifier 39, and a normally open switch 40, connected as shown. This D.C. voltage supply provides a bias voltage, while pulse generator 34 provides a continuing succession of voltage pulses, in a manner similar to the operation of voltage supply 8 and pulse generator 7 of the Fig. 1 circuit. In the Fig. 3 embodiment, generator 34 supplies pulses having a fixed pulse rate, amplitude and duration.

With switch 40 open, voltage source 75 provides a selected value of bias voltage for steady-state operation of diodes 16, 18, 20 and 22. When switch 40 is closed, voltage source 36 provides a more negative bias voltage, for purposes hereinafter explained. The resistance of resistor 37 is sufficiently small that there is no appreciable change in the bias voltage when the number of conducting diodes changes in accordance with changes in the information stored by the matrix.

The rate, amplitude and width of the pulses provided by pulse generator 34, the magnitude of the bias voltage provided by voltage source 35, and the resistance values of resistors 28, 29, 30 and 31, are given fixed values, selected in accordance with the principles hereinbefore disclosed, that provide steady-state operating conditions for diodes 16, 18, 20 and 22, such that, in the absence of any light from glow discharges within diodes 17, 19, 21 and 23, the voltage pulses applied between conductors 32 and 33 will maintain, but will not initiate, a continuing succession of glow discharges within each of the diodes 16, 18, 20 and 22. Thus, there are provided four two-state circuits, each comprising one of the four first diodes. Each two-state circuit can operate in either state regardless of the operating states of the other three two-state circuits. Therefore, the four-unit matrix illustrated has 16 possible combinations of stable operating states, which provides a memory capacity of four bits in the binary system.

Whenever switch 40 is closed, voltage source 36 provides a sufficiently large negative bias voltage to interrupt any continuing succession of glow discharges that may be in existence within any of the four first diodes 16, 18, 20 and 22. Thus switch 40 provides means for erasing any information that has been previously stored within the matrix. After the information has been erased, and all four of the first diodes are deionized, switch 40 is opened again to restore the steady-state operating conditions. Although switch 40 has been illustrated as a simple mechanical switch, it is evident that other switching means may be employed for the same purpose, if desired. For example, the same result can be achieved by means of a selectively operable pulse generator connected for supplying across resistor 37, at selected times, a negative voltage pulse of appropriate amplitude and duration. Since the duration of the erasing pulse may be only slightly greater than the deionization time of the diodes, which may be as short as 6 milliseconds or less under appropriately chosen operating conditions, the erasing pulses may be supplied, if so desired, by well-known electronic circuits of substantially conventional design. If desired, separate bias and erasing circuits may be provided for different portions of the matrix, so that information stored in a particular portion of the matrix, or even in a single memory unit, can be erased without erasing information stored in other portions of the matrix.

The read-in or writing of information is accomplished by striking temporary glow discharges within selected ones of the four second diodes 17, 19, 21 and 23. A glow discharge within any one of these second diodes supplies light into the first diode of the same memory unit, which changes the operating conditions of the last-mentioned diode sufficiently for the striking of an initial glow discharge within that diode. Thereafter, the pulses supplied between conductors 32 and 33 maintain a continuing sucession of glow discharges within the same diode, so that the information is stored or remembered, for any desired length of time, until it is deliberately erased by the closing of switch 40.

The striking of glow discharges within selected ones of the second diodes can be accomplished by connecting these diodes into substantially conventional matrix circuits. For example, in the circuit illustrated, the upper electrodes of the four second diodes are connected together by columns, whereas the lower electrodes of the same second diodes are connected together by rows, so that an electrical circuit to any particular one of these four diodes can be completed by selecting a particular row and column. Thus, each of the two second diodes 17 and 21 in the left column has an electrode connected to conductor 41, and each of the two second diodes 19 and 23 in the right column has an electrode connected to conductor 42. Each of the two second diodes 17 and 19 in the top row has an electrode connected to a conductor 43, and each of the two second diodes 21 and 23 in the bottom row has an electrode connected to a conductor 44.

A "column selector" switch 45 is provided for connecting conductor 46 to either of the two conductors 41 and 42, selectively. A "row selector" switch 47 is provided for connecting a conductor 48 to either of the two conductors 43 and 44, selectively. By operating the two selector switches 45 and 47, it is evident that each of the four second diodes, one at a time, selectively, can be connected between conductors 46 and 48. For simplicity, switches 45 and 47 have been illustrated as simple mechanical switches. It is evident that they may be replaced, if desired, with electronic or electromagnetic switching means of well-known types.

A three-position switch 49 can be thrown to the left for connecting conductor 46 to conductor 50, can be thrown to the right for connecting conductor 46 to conductor 51, and can be moved to the neutral position shown wherein conductor 46 is not connected to either of the conductors 50 and 51. Similarly, a three-position switch 52 can be thrown to the left for connecting conductor 48 to a conductor 53, or can be thrown to the right for connecting conductor 48 to a conductor 54, and can be moved to the neutral position shown wherein conductor 48 is not connected to either of the conductors 53 or 54. Switches 49 and 52 may be ganged together, as is conventionally indicated by the broken line connecting these two switches.

A D.C. voltage supply 55 is connected in series with a resistor 56 between conductors 51 and 53, as shown. Supply 55 provides a voltage exceeding the glow-discharge striking voltages of the second diodes 17, 19, 21 and 23. Whenever switches 49 and 52 are thrown to the left, the voltage provided by supply 55 is applied between conductors 46 and 48, and thus is applied through switches 45 and 47 across a selected one of the second diodes 17, 19, 21 and 23. This voltage strikes a glow discharge within the selected diode, and the light from this glow discharge switches the corresponding memory unit from its first (non-discharging) to its second (a continuing succession of discharges) operating state. Thus, a bit of information can be read into any selected one of the four binary memory units, where it will be stored until it is deliberately erased.

By appropriate operations of the switches, it is obvious that successive bits of information can be stored in successive memory units. It is also obvious that it is not necessary to employ mechanical switches 49 and 52, but that the reading-in or writing of information can be accomplished by any means, such as an appropriately connected pulse generator, for providing voltage pulses of appropriate amplitudes and durations between conductors 46 and 48 at appropriate times.

For reliable writing of a bit of information into a memory unit, the glow discharge within the second diode of that unit should persist long enough to insure a supply of light into the first diode of the same memory unit during, or at least immediately preceding, the application of a voltage pulse to the first diode. This is easily insured by making the width or duration of each writing pulse provided between conductors 46 and 48 at least as long as the period of the succession of pulses provided by pulse generator 34. Thus, if pulse generator 34 supplies 1,000 pulses per second, then the writing pulses may have a minimum width of 1 millisecond. Shorter writing pulses can be employed if the writing pulses are synchronized with pulse generator 34 to insure the application of a pulse across the first diode of a memory unit during, or immediately following, the time that the writing pulse maintains a glow discharge within the second diode of the same unit. The statement "immediately following" comprehends a very brief period, due to certain delays inherent in the physical processes involved, during which the light from a glow discharge in one diode is effective to trigger a glow discharge in the other diode after the current of the first discharge substantially ends. This brief period may be in the order of a few microseconds.

With the circuit connections illustrated and described, it is apparent that only one diode at a time is connected to the writing or read-in circuit, and that there is no electrical connection at any time between the read-in circuit and the first diodes wherein information is stored. Consequently, there is no appreciable possibility that a read-in operation can affect the operating state of any memory unit other than the unit selected for storage of the input bit. Thus a high degree of reliability is obtained, and the practical difficulties and malfunctionings that have heretofore impeded the use of glow-discharge diodes as storage elements in large-capacity matrices are avoided.

Read-out of the stored information is accomplished by closing switches 49 and 52 to the right, so that conductor 46 is connected to conductor 51 and conductor 48 is connected to conductor 54. Thus, the second diode of each memory unit, one at a time, selectively, can be connected between conductors 51 and 54 by adjusting the positions of selector switches 45 and 47. Connected in series between conductors 51 and 54 are a pulse generator 57, a D.C. voltage source 58, and a load resistor 59. Pulse generator 57 supplies a continuing sequence of voltage pulses having a selected rate, amplitude and width, source 58 provides a bias voltage of a selected value, and resistor 59 provides a series circuit resistance of selected value, all said values being chosen, according to the principles hereinbefore explained, to provide operating conditions for the second diode selected by the selector switches such that the voltage pulses supplied by generator 57 will strike glow discharges within the selected second diode in the presence of light supplied into that diode from glow discharges within the first diode of the same memory unit, but will not strike glow discharges in the absence of such light.

Preferably, pulse generator 57 is synchronized to pulse generator 34, as by applying a synchronizing pulse to generator 57 through a delay line 60, so that each pulse provided by generator 57 begins a few microseconds after the beginning of a pulse supplied by generator 34. Therefore, if the pulses provided by generator 34 are producing glow discharges within the first diode of a selected memory unit, the pulses supplied to the second diode by generator 57 begin during, or immediately following a glow discharge in the first diode, while the glow discharge in the first diode is effectively supplying light into the second diode. Thus, glow discharges are struck in the selected second diode if a bit of information has been stored in the selected memory unit, but are not struck in the absence of a stored bit.

Each time that a glow discharge is struck in the selected second diode, a voltage pulse appears across series load resistor 59. Thus, the presence or absence of a stored bit in the selected binary storage unit is indicated by the presence or absence of voltage pulses across resistor 59. By changing the positions of selector switches 45 and 47, each of the second diodes in turn may be connected between conductors 51 and 54, and all of the information stored within the matrix can be read out. For supplying the voltage pulses across resistor 59 to utilization circuits, output connections 61 and 62 are provided, as shown.

It should be noted that the read-out is nondestructive—that is, read-out does not affect the operating states of the first diodes. The stored information can be read out whenever desired, and as many times as desired. No erasure occurs until switch 40 is closed for deliberately erasing the stored information. Because there is no electrical connection between the read-in and read-out circuits and the storage circuits, a very high degree of reliability is obtained. The circuit connections are exceptionally simple, and the cost of the matrix is quite low relative to that of other information-storage systems capable of comparable performance.

To expand the storage matrix and provide greater information-storage capacity, it is only necessary to add additional rows and columns of binary memory units, with one memory unit at the intersection of each row and column. Each of the additional binary memory units can be identical to the four units illustrated in Fig. 3, and may consist essentially of two gas-filled diodes. Each of the first diodes is connected in series with a resistor to form a branch circuit, and all of the branch circuits so formed are connected in parallel between conductors 32 and 33. Each of the second diodes in each matrix column has one electrode connected to one terminal of the "column selector" switch 45, and each of the second diodes in each row has one terminal connected to a terminal of the "row selector" switch 47. Thus, switch 45 must have as many switch positions as there are columns of memory units in the matrix, and switch 47 must have as many switch positions as there are rows of memory units in the matrix. This is easily accomplished by using multi-position switches, or by using combinations of switches arranged in "tree" fashion, as in the well-known relay tree circuits.

It should be understood that this invention in its broader aspects is not limited to specific examples herein illustrated and described. The following claims are intended to cover all changes and modifications within the true spirit and scope of the invention.

What is claimed is:

1. A method for operating a glow-discharge device, which comprises applying a continuing succession of voltage pulses across a glow-discharge device, establishing steady-state operating conditions for the glow-discharge device such that the succession of voltage pulses will maintain a continuing succession of glow discharges within said device but will not initiate such a succession of glow discharges, and providing transient changes from said steady-state conditions for initiating and terminating such succession of glow discharges at selected times.

2. A method for operating a glow-discharge device as a binary memory unit, which comprises applying in steady-state operation a continuing succession of voltage pulses across a gas-filled diode within which glow discharges can occur, said pulses being separated by time intervals shorter than the deionization time of said diode, each of said pulses exceeding the nominal glow-discharge striking voltage of said diode and having a duration sufficient to strike a glow discharge within said diode in the presence of ionization remaining from a glow discharge during the preceding pulse but insufficient to strike a glow discharge in the absence of such ionization, whereby said pulses will maintain a succession of glow discharges within said diode but will not initiate such a succession of discharges unaided, and providing transitory agents for initiating and terminating such a succession of glow discharges at selected times.

3. A method for operating a glow-discharge device as a binary memory unit, which comprises applying a continuing succession of voltage pulses across a gas-filled diode, said pulses being separated by time intervals shorter than the deionization time of said diode, each of said pulses exceeding the nominal glow-discharge striking voltage of said diode and having a duration sufficient to strike a glow discharge within said diode in the presence of ionization remaining from a glow discharge during the preceding pulse but insufficient to strike a glow discharge in the absence of such ionization, whereby said pulses will maintain a succession of glow discharges within said diode but will not initiate such a succession of discharges unaided, and providing other voltage pulses across said diode for initiating and terminating such a succession of glow discharges at selected times.

4. A binary memory unit, comprising a gas-filled diode that light can enter, a lamp positioned to supply light into said diode, means for selectively lighting and extinguishing said lamp, means for applying a continuing succession of voltage pulses across said diode, said pulses being separated by time intervals shorter than the deionization time of said diode, said pulses exceeding the nominal glow-discharge striking voltage of said diode and having durations sufficient to strike an initial glow discharge within said diode when said lamp is lit and sufficient to strike succeeding glow discharges within said diode when said lamp is extinguished but insufficient to strike an initial glow discharge within said diode when said lamp is extinguished, whereby a temporary lighting of said lamp initiates a continuing succession of glow discharges within said diode.

5. A binary memory unit, comprising first and second glow-discharge lamps positioned side by side so that a luminous discharge in either supplies light into the other, means for supplying a continuing succession of voltage pulses across said first lamp, said pulses being separated by time intervals shorter than the deionization time of said first lamp, said pulses exceeding the nominal glow-discharge striking voltage of said first lamp and having durations sufficient to strike an initial glow discharge within said first lamp in the presence of light supplied by a glow discharge within said second lamp and sufficient to strike succeeding glow discharges within said first lamp in the absence of such light but insufficient to strike an initial glow discharge within said first lamp in the absence of such light, whereby a glow discharge within said second lamp initiates a continuing succession of glow discharges within said first lamp, means for supplying across said second lamp at selected times a pulse of voltage sufficient to strike a glow discharge therein in the absence of light from said first lamp, whereby a bit of binary information can be stored in the memory unit, means for interrupting said succession of glow discharges and deionizing said first lamp at selected times, whereby the stored information can be erased, and read-out means for providing across said second lamp at selected times voltage pulses sufficient to strike glow discharges within said second lamp in the presence of light supplied by glow discharges within said first lamp but insufficient to strike a glow discharge within said second lamp in the absence of such light, whereby bits of stored information are indicated by pulses of substantial current through said second lamp.

6. An information storage matrix, comprising a plurality of storage units each including a first and second cold-cathode gas-filled diode within which luminous glow discharges can occur, said diodes being so disposed that a luminous discharge within either diode of any storage unit supplies a substantial amount of light into the other diode of the same storage unit but does not supply a substantial amount of light into any diode of the other storage units, a plurality of resistors connected in series with respective ones of said first diodes, circuit connections forming a plurality of branch circuits each including one of said first diodes in series with one of said resistors, said branch circuits being connected in parallel with one another, pulse generator means connected and operable to supply a continuing succession of voltage pulses across said branch circuits, said pulses being separated by time intervals shorter than the deionization times of said first diodes, said pulses exceeding the nominal glow-discharge striking voltages of said first diodes and having durations sufficient to strike initial glow discharges within each of said first diodes in the presence of light supplied by a glow discharge within the second diode of the same storage unit and sufficient to strike succeeding glow discharges within the same first diodes in the absence of such light but insufficient to strike an initial glow discharge within any of said first diodes in the absence of such light whereby a temporary glow discharge within the second diode of any of said storage units initiates a continuing succession of glow discharges within the first diode of the same unit, means for supplying at selected times across selected ones of said second diodes pulses of voltage sufficient to strike a glow discharge therein in the absence of light, whereby bits of binary information can be stored in selected ones of said storage units, means for applying across said branch circuits at selected times a bias voltage sufficient to interrupt the succession of glow discharges within said first diodes, whereby the stored information can be erased, an output circuit, means for connecting each of said second diodes, one at a time selectively, in series with said output circuit, and means for applying at selected times across said output circuit and the selected one of said second diodes in series a voltage pulse sufficient to strike a glow discharge within the selected second diode in the presence of light supplied by a glow discharge within the first diode of the same storage unit but insufficient to strike such a glow discharge in the absence of light, whereby the presence of a bit of information stored in that unit is indicated by a pulse of current through said output circuit.

7. A binary memory unit comprising a glow-discharge device, control means for said device adapted to maintain therein a continuing succession of uninterrupted glow discharges subsequent to discharge initiation and insufficient of itself to initiate glow discharge, means for supplementarily controlling said glow-discharge device to initiate the succession of discharges by introducing at a selected time period a transient change on the device, and means for terminating the succession of glow discharges at selected time intervals.

8. A binary memory unit comprising a first glow-discharge device, control means for said glow-discharge device adapted to maintatin therein a continuing succession of uninterrupted glow discharges and insufficient of itself to initiate the said glow discharge, a second glow-discharge device for supplementarily controlling said first glow-discharge device to initiate the succession of discharges by introducing at a selected time period a transient change on the said first glow-discharge device, and means for terminating the succession of glow discharges in the said first glow-discharge device at selected time intervals.

9. A binary memory unit including a glow-discharge device, means to maintain a steady state of operation within the said glow-discharge device following an operation initiation, external means for producing transient changes in the operating state of said glow-discharge device for initiating the continued discharge therein, and means for interrupting the glow discharge at selected times.

10. A binary memory unit including a glow-discharge device, means to maintain a steady state of continued glow discharge operation within the said glow-discharge device following an operation initiation, optical means for directing light within the said glow-discharge device producing transient changes in the operating state thereof for initiating the steady state of continued discharge therein, and means for interrupting the glow discharge at selected times.

11. A binary memory unit comprising a first glow-discharge device, control means for said device adapted to maintain a continuing succession of uninterrupted glow discharges in said glow-discharge device and insufficient of itself to initiate the glow discharge, an electrically separated second glow-discharge device for supplementarily controlling said first glow-discharge device to initiate therein the succession of discharges by introducing at a selected time period a transient change on the said first glow-discharge device, and means for terminating the said succession of glow discharges in said first glow-discharge device at selected time intervals.

12. A binary memory unit comprising a gas-filled discharge tube adapted to release light with activation, a light source connected to supply light to said gas-filled discharge tube, control means for selectively illuminating and extinguishing the light source, means to supply to the gas-filled discharge tube a succession of control pulses separated from one another in time by a period less than the deionization period of the said gas-filled discharge tube and, of themselves, insufficient to strike an initial ionization of the said tube during periods of extinguishment of the said light source and during a state of illumination to the gas-filled discharge tube to change the tube operational characteristics to initiate glow discharge and ionization, and means to register the illuminating effect.

13. A binary memory unit comprising a glow-discharge device, pulse generator means to develop control pulses of controllable rate, amplitude and duration, means to supply said pulses to said glow-discharge device to maintain therein a continuing succession of uninterrupted glow discharges subsequent to discharge initiation and insufficient of itself to initiate glow discharge, means for supplementarily controlling said glow-discharge device to initiate the succession of discharges by introducing at a selected time period a transient change on the device, and means for terminating the succession of glow discharges at selected time intervals.

References Cited in the file of this patent

UNITED STATES PATENTS

| | | |
|---|---|---|
| 2,828,447 | Mauchly | Mar. 25, 1958 |
| 2,829,308 | Foote et al. | Apr. 1, 1958 |
| 2,829,309 | Foote | Apr. 1, 1958 |